US006325487B1

(12) United States Patent
Mantell (10) Patent No.: US 6,325,487 B1
(45) Date of Patent: Dec. 4, 2001

(54) SYSTEMS AND METHODS FOR GENERATING HIGH ADDRESSABILITY IMAGES

(75) Inventor: David A Mantell, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/343,529

(22) Filed: Jun. 30, 1999

(51) Int. Cl.$^7$ ............................................. B41J 2/15
(52) U.S. Cl. .......................... 347/41; 358/1.2; 358/448
(58) Field of Search .............................. 347/41, 12, 40, 347/15, 43; 358/1.2, 1.9, 503, 521, 534, 447, 448, 429; 382/251, 237

(56) References Cited

U.S. PATENT DOCUMENTS

| | | | |
|---|---|---|---|
| 4,814,886 | * 3/1989 | Kuge et al. ........................ | 358/293 |
| 5,528,384 | 6/1996 | Metcalfe et al. ..................... | 358/447 |
| 5,608,821 | 3/1997 | Metcalfe et al. ..................... | 382/252 |
| 5,655,061 | * 8/1997 | Tse et al. ............................. | 358/455 |
| 5,675,365 | 10/1997 | Becerra et al. ........................ | 347/9 |
| 5,696,601 | 12/1997 | Metcalfe et al. ..................... | 358/447 |
| 5,748,785 | 5/1998 | Mantell et al. ....................... | 382/237 |
| 5,787,206 | 7/1998 | Williams et al. ..................... | 358/456 |
| 5,809,177 | 9/1998 | Metcalfe et al. ..................... | 358/448 |
| 5,880,857 | 3/1999 | Shiau et al. ........................... | 358/447 |

(List continued on next page.)

OTHER PUBLICATIONS

"Analytic Description of the 1–D Error Diffusion Technique for Halftoning", R. Eschbach and R. Hauck, Optics Communications, vol. 52, No. 3, pp. 165–168, Dec. 1, 1984.

"Implicit Binarization Procedures in 1–D", R. Eschbach and R. Hauck, Optics Communications, vol. 54, No. 2, pp. 71–74, May 15, 1985.

"Binarization Using a Two–Dimensional Pulse Density Modulation", R. Eschbach and R. Hauck, Journal of the Optical Society of America A—Optics and Image Science, vol. 4, No. 10, pp. 1873–1878; Oct. 1987.

"Pulse–Density Modulation on Rastered Media: Combining Pulse–Density Modulation and Error Diffusion", R. Eschbach, Journal of the Optical Society of America A, vol. 7, No. 4, pp. 708–716, Apr. 1990.

"Analysis of Threshold Modulations in One–Dimensional Error Diffusion", R. Daels, R. L. Easton and R. Eschbach, Optics Communications 87, vol. 87, No. 3, pp. 93–98, Jan. 15, 1992.

(List continued on next page.)

*Primary Examiner*—N. Le
*Assistant Examiner*—Lamson D. Nguyen
(74) *Attorney, Agent, or Firm*—Oliff & Berridge, PLC (57) ABSTRACT

Image systems and methods generate improved high addressability images. The generated image may be input into a printer for printing. An image is processed so that the location of an ink drop in a high addressability image is determined. The location of a printed subpixel, within a pixel, is determined by the magnitude of the grayscale value of an observed pixel, the magnitude of the error that has been previously accumulated, and a predetermined threshold value. The grayscale value of the observed pixel, accumulated error, and threshold value are used to determine a subpixel value. This subpixel value determines how soon another subpixel is fired after a previously fired subpixel. If the subpixel value is low, then another subpixel will be fired relatively soon after the previously fired subpixel. If the subpixel value is high, then the printer will wait a longer time before firing another subpixel. In other words the lower the subpixel value the sooner another subpixel prints. The image generating process may effectively weight the error on neighboring pixels to effectively generate images having both shadow and highlight regions.

28 Claims, 4 Drawing Sheets

U.S. PATENT DOCUMENTS

| | | | |
|---|---|---|---|
| 5,903,361 | 5/1999 | Shiau et al. | 358/455 |
| 5,933,539 | 8/1999 | Metcalfe et al. | 358/465 |
| 6,020,979 * | 2/2000 | Zeck et al. | 358/1.9 |

OTHER PUBLICATIONS

"Reduction of Artifacts in Error Diffusion by Means of Input–Dependent Weights", R. Eschbach, Journal of Electronic Imaging, vol. 2, No. 4, pp. 352–358, Oct. 1993.

* cited by examiner

FIG. 7

SYSTEMS AND METHODS FOR GENERATING HIGH ADDRESSABILITY IMAGES

BACKGROUND OF THE INVENTION

1. Field of Invention

This invention relates to systems and methods for generating high addressability images.

2. Description of Related Art

The pixels in a binary image may be either on or off, i.e., black or white, respectively. In particular, the binary image may be a binary image possessing both highlights and shadows and having normal addressability. However, various devices have the capability to generate a high addressability image. A high addressability binary image is an image created by a device such that the spatial addressability of the image pixel by the device is finer than the size of the writing spot of that device. High addressability also often refers to an addressability resolution in a first direction that is finer than the spatial addressability resolution in a second direction that is, for example, perpendicular to the first direction. High addressability data can be used to render edges in text and line art regions at a high spatial precision in the high addressability direction. High addressability data can also be used in halftone regions to provide additional spatial resolution in the high addressability direction.

Figure 1:
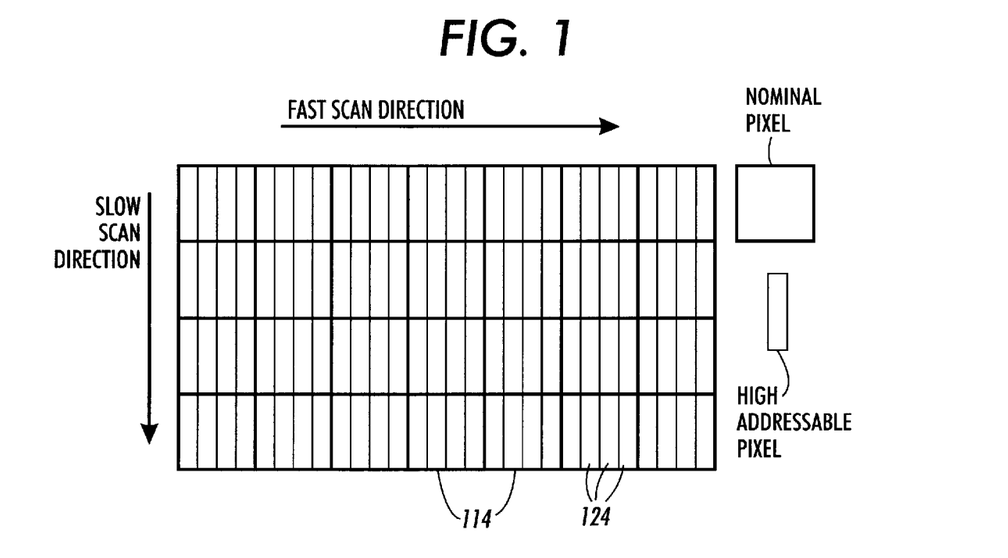
FIG. 1 is a diagram showing an exemplary conventional high addressability pixel grid.

Illustratively, FIG. 1 is a diagram showing a high addressability pixel grid. As shown in FIG. 1, the spatial addressability of the pixels in the horizontal direction, i.e., the fast scan direction, is finer than in the vertical direction, i.e., the slow scan or process direction. FIG. 1 illustrates an image having a high addressability of 4. That is, each nominal "pixel" 114 contains four "subpixels" 124. This distinction between a pixel 114 and a subpixel 124 is used throughout this application. Images may have various other high addressability values, such as an addressability of 8. A high addressability image may be referred to as an "anamorphic" image since the high addressability image possesses different spatial resolutions in mutually perpendicular directions. In contrast, an "isomorphic" image possesses the same spatial resolution in mutually perpendicular directions.

SUMMARY OF THE INVENTION

However, problems occur in conventional methods when inputting and manipulating images, and subsequently reproducing or printing high addressability images. In particular, problems occur in the conventional methods when printing high addressability binary images or image regions, such as images possessing shadows and highlights, for example. The image may be black and white only, or in color.

Random access ink jet printers, such as those disclosed in U.S. Pat. No. 5,675,365 to Becerra et al., allow great flexibility in the sequence in which individual pixels are printed or fired. This occurs by allowing the individual ink ejections to be scheduled, rather than addressing them in a fixed order at a fixed clock speed. This scheduling allows more flexibility in which particular pixels may be printed to achieve a desired image on a recording medium using a choice of pixel firing patterns.

In a conventional ink ejection device, such as those disclosed in the 365 patent, an individual ink ejector is addressed at some frequency f. That ink ejector is either fired or not fired each time it is addressed. However, such an ink ejection device actually addresses the ink ejectors at a rate that is much faster than f, i.e., at the clock rate. These known devices provide flexible addressing and allow an ejector to be fired at any clock cycle.

However, there are constraints on the degree of flexibility. One constraint is that an individual ink ejector can not be repeatedly fired too soon or the ink ejector will not have time to refill between firing. Another constraint is that only a certain number of ink ejectors can be fired at a time due to operation limitations of the printing device relating to the ink supply to the ink ejectors. However, it has been observed that neither of these constraints greatly limits the flexibility of current known ink ejection devices.

Illustratively, neither constraint need be violated for a known ink ejection device to print full black. For known devices, such as those disclosed in the 365 patent, to print gray, the ink ejection print head only needs to lower the frequency at which a given ink ejector is fired from that necessary for full black.

However, there are various problems with known devices in printing high addressability images. One problem occurs when printing high addressability images having highlights. When printing such images, a substantial amount of processing time is spent trying to optimize the highlights. However, in highlights, there is little advantage to high addressability. The second problem observed with conventional methods is that the extension of such conventional methods to print color high addressability images is difficult.

Further, other known methods of printing high addressability images interpolate between pixel values, and in particular between subpixel values in the high addressability image. Using this interpolation, the known methods determine which subpixels are turned on and which subpixels are left off. This approach takes advantage of the ability of known printers to start or stop printing at a fractional pixel. In such printing, it should be appreciated that there is a practical constraint on both the smallest image pixel size and the smallest gap size between printing.

However, this approach involving printing a fractional pixel is not possible in an ink jet printer. Known ink jet printer techniques allow a determination of which subpixel the drop is printed in. However, known ink jet printer technology cannot print a fractional drop, i.e., a part of a drop. Accordingly, the conventional processes have various problems associated with them.

Accordingly, this invention provides systems and methods that generate a high addressability image using an ink ejection image forming device.

This invention separately provides systems and methods that print a high addressability binary image using random access ink ejecting printing techniques.

This invention separately provides systems and methods that print a high addressability binary image, where the number of drops printed in each pixel is at least one but less than the addressability of the apparatus used to print the image.

This invention separately provides systems and methods for printing high addressability images which are easily extended to color.

This invention separately provides systems and methods for directly determining the address of where a pixel prints and thus eliminating the need to convert a high addressability binary file into a format needed by the printhead.

This invention separately provides systems and methods for printing high addressability images that reduce any introduced image defects in the printed image.

This invention separately provides systems and methods that use information of neighboring pixel values to print a high addressability pixel group.

This invention separately provides systems and methods for performing an error diffusion process for thermal ink jet printing.

This invention separately provides systems and methods for performing fast printing that does not require substantial additional processing time over regular error diffusion processes.

This invention separately provides systems and methods for automatically compressing outputted data into a format needed for known random access ink ejection chip architectures.

This invention separately provides systems and methods for printing high addressability pixels in an image in a manner such that images including highlights may be printed while limiting the presence of artifacts, such as worms, in the image.

The term "worms" refers to artifacts generated by error diffusion in highlight (and shadow) regions, in which marks (or unmarked areas, in shadow regions) are not distributed equally in two dimensions, such that curved lines are visible in the error diffusion region.

The exemplary embodiments of the systems and methods of the invention generate improved high addressability images. In accordance with the systems and methods of the invention, a normal addressability grayscale image is input. The input image may alternatively be in the form of high addressability bit pixels.

In accordance with one exemplary printing technique according to the systems and methods of this invention, a high addressability image is printed such that the location of an ink drop in a high addressability image is determined based on the current value of the input pixel, an accumulated error, and a threshold value. In particular, the location of a printed subpixel within the pixel is determined by the magnitude of the grayscale value of an observed pixel, the magnitude of the error that has been previously accumulated, and a predetermined threshold value.

In accordance with another exemplary embodiment of the systems and method of the invention, the grayscale value of the observed pixel, accumulated error, and threshold value are used to determine a pixel value. This pixel value determines how soon a next subpixel is fired after a previously fired subpixel. If the pixel value is high, then the next subpixel will be fired relatively soon after the previously fired subpixel. If the pixel value is low, then the printer will wait a longer time before firing the next subpixel. In other words, the higher the pixel value, the sooner the next subpixel prints or fires.

It should be appreciated that the systems and methods according to the invention are applicable to a wide variety of image processes. Thus, while the systems and methods in accordance with the invention may be directed to printing high addressability image, it should be recognized that high addressability images may be generated and manipulated in accordance with the invention in various ways other than printing. Further, it should be recognized that the systems and methods described herein can be used in conjunction with various other processes and systems.

These and other features and advantages of this invention are described in or are apparent from the following detailed description of the exemplary embodiments.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 2:
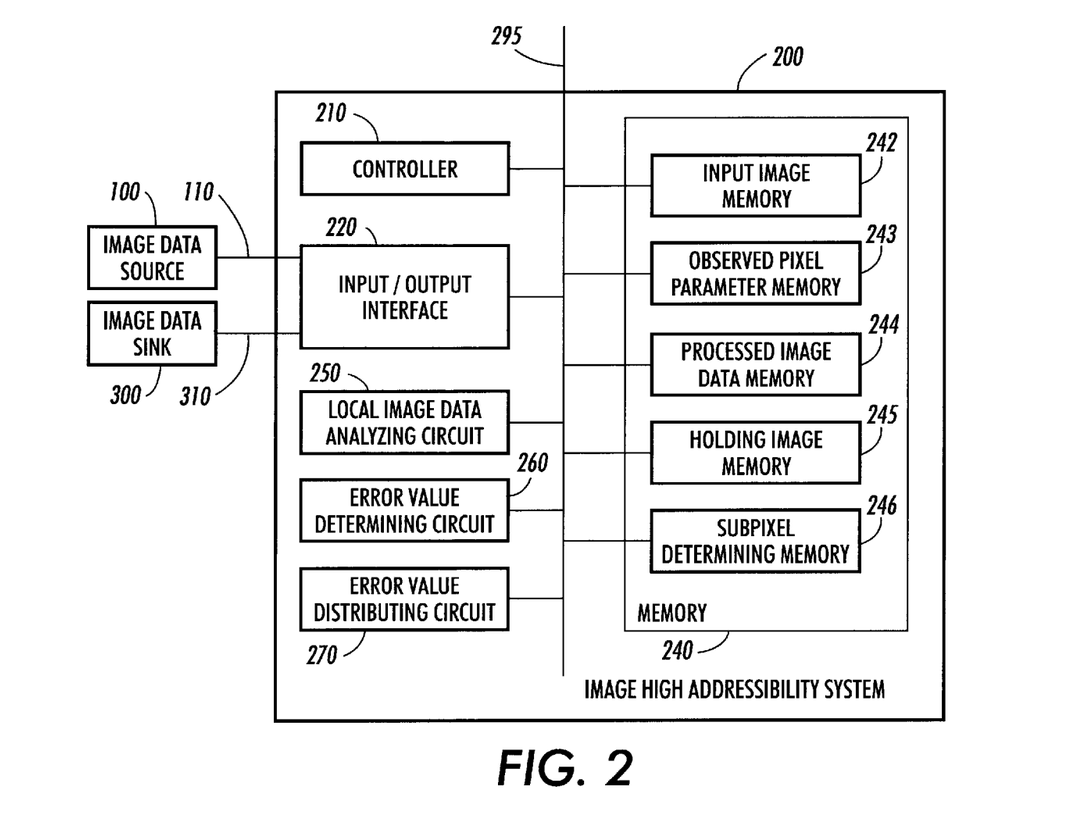
FIG. 2 is a functional block diagram of one exemplary embodiment of an image high addressability system in accordance with this invention.

FIG. 2 shows one exemplary embodiment of a generalized functional block diagram of a high addressability ink ejection printing system 200 according to this invention. The high addressability ink ejection printing system 200 is connected to an image data source 100 over a signal line or link 110 and to an image data sink 300 over a signal line or link 310. The image data source 100 may be used to provide a wide variety of image data to the high addressability ink ejection printing system 200. The image data sink 300 receives processed images output by the high addressability ink ejection printing system 200. The received images may then be printed, for example.

In general, the image data source 100 can be any one of a number of different sources, such as a scanner, a digital copier, a facsimile device, or any other known or later developed device that is suitable for generating electronic image data, or any known or later developed device suitable for storing and/or transmitting electronic image data, such as a client or server of a network. Further, the image data source 100 does not necessarily have to be a single device, but rather may be formed by two or more separate devices.

Thus, the image data source 100 can be any known or later developed source that is capable of providing monochrome or color data to the high addressability ink ejection printing system 200 of this invention. Similarly, the image data sink 300 can be any known or later developed device that is capable of receiving the processed image data output by the high addressability ink ejection printing system 200 and either storing, transmitting, printing and/or displaying that processed image data.

The link 110 can be any known structure or apparatus for transmitting the image data from physically remote image data source 100, such as a storage device for indefinitely storing the image data until there arises a need to process the image data. Similarly, the link 310 can be any known structure or apparatus for transmitting the image data from the high addressability ink ejection printing system 200 to a physically remote image data sink 300, such as a remote storage device or remote display device, such as a printer. Thus, the links 110 and 310 can be a public switched telephone network, a local or wide area network, an intranet, the Internet, a wireless transmission channel, any other distributing network, or the like.

Similarly, the storage device can be any known structural apparatus for indefinitely storing the image data, such as a RAM, a hard drive and disk, a floppy drive and disk, an optical drive and disk, a flash memory, or the like. Finally, the display device can be any known device for displaying or rendering an image. Thus, the display device can be a CRT, an active or passive matrix LCD, an active or passive LED display, a laser printer, an ink jet printer, a digital copier, or the like.

As indicated above, the image data source 100 and the image data sink 300 can be physically remote from the high addressability ink ejection printing system 200 and reachable over the links 110 and 310 described above. Alternatively, the high addressability ink ejection printing system 200 can be integrated with either or both of the image data source 100 and the image data sink 300. For example, the image data source 100 can be a scanner of a digital photocopier, while the image data sink 300 is an image output terminal of the digital copier.

As shown in FIG. 2, the high addressability ink ejection printing system 200 includes a controller 210, an input/output interface 220, a memory 240, a local image data analyzing circuit 250, an error value determining circuit 260 and an error distributing circuit 270, each of which is connected to a data bus 295. The input/output interface 220 is also connectable to the image data source 100 and the image data sink 300 over the signal lines or links 110 and 310, respectively.

In general, the local image data analyzing circuit 250 converts normal addressability data to high addressability data. The error determining circuit 260 determines an error value between the grayscale or multi-bit image data value for a current pixel and the effective multi-bit image value. The error distributing circuit 270 then distributes the determined error value to at least one subsequent input resolution pixel. The particular methods for distributing the error value are outlined in detail below.

The effective multi-bit image value of the high addressability data, and thus the sign of the error value, depends on whether the high addressability data indicates a mark is to be created or not. This is, if the high addressability data indicates a mark is to be created, that mark corresponds to the black multi-bit image data value and the difference between the full black multi-bit image data value and the image data value at the normal or input addressability indicates the amount of over-marking that occurred due to generating the high addressability mark. In contrast, if the high addressability data indicates that a mark is not to be formed, the error value indicates the amount of under-marking that occurred for the input pixel. It should be appreciated that, for an image data scheme that uses the maximum multi-bit image data value to indicate black, a positive error value indicates over-marking, while a negative error value indicates under-marking. In contrast, for an image data scheme that represents black using the minimum image data value, positive error values indicate under-marking, while negative error values indicate over-marking.

As shown in FIG. 2, the memory 240 includes an input image memory 242, a observed pixel parameter memory 243, a processed image data memory 244, a holding image memory 245, and a subpixel determining memory 246. The input image memory 242 temporarily stores image data, prior to processing, that has been input into the high addressability ink ejection printing system 200. The observed pixel parameter memory 243 stores information obtained from an observed target pixel and/or the corresponding neighborhood of the observed target pixel. The processed image data memory 244 temporarily stores processed image data that has been processed by the high addressability ink ejection printing system 200 prior to outputting the processed image. In particular, the processed image data memory 244 stores the accumulated error for each of the subsequent pixels to which previously determined error values have been distributed. The holding image memory 245 stores image data on a long term basis either before or after processing.

The image data may be input from the image data source 100 through the input/output interface 220, or, alternatively, may result from retrieving an image previously stored in the high addressability ink ejection printing system 200 and specifically stored in the holding image memory 245. The subpixel determining memory 246 stores appropriate information for transforming an image that is to be processed into a high addressability image. This information may be in the form of a quantitative relationship or equation. Alternatively, the information may be in the form of a look-up table.

The memory 240 also stores any necessary control programs and/or data required by the high addressability ink ejection printing system 200. Thus, the memory 240 can be implemented using static or dynamic RAM, a floppy disk and disk drive, a writable optical disk and disk drive, a hard disk and disk drive, flash memory, or the like. The memory 240 can also include read only memory, including PROMs, EPROMs, EEPROMs, a CD-ROM and disk drive, or the like.

In accordance with the systems and methods of this invention, a high addressability binary image may be generated from a normal addressability image that has been input, using the high addressability ink ejection printing system 200 shown in FIG. 2. In particular, the high addressability ink ejection printing system 200 may be used to generate a high addressability binary image comprising high addressability bit pixels for printing using the image data sink 300, such as an ink jet printer.

For an ink jet printer, the fast scan direction is the direction in which the printhead sweeps to print an image on a recording medium. The recording medium may be a sheet of paper, for example. The paper is advanced in a direction perpendicular to the fast scan direction, i.e., the slow scan or process direction. The paper may be advanced using a rotating drum, for example. It should be recognized that various other writing devices may also have high addressability capability, such as an LED image bar writer or a laser raster output scanner. Accordingly, while systems and methods of the invention are directed to an ink ejection printing system, as described herein, it should be appreciated that the systems and methods of the invention may be applied to a wide variety of devices. In general, the systems and methods of the invention can be applied to any device that does not allow the print intensity to be modulated. That is, the systems and methods of the invention are particularly useful in fixed intensity printing devices.

FIG. 1 shows the size of a nominal pixel and a high addressability pixel. The addressability in the fast scan direction may be controlled by a printhead of the image data source 300, for example. The addressability in the slow scan or process direction may be controlled by the advance mechanism of the image data source 300. The print head is capable of resolution of the high addressability pixel. However, the advance mechanism is not capable of such fine resolution. Rather, the paper feed mechanism is only capable of a nominal pixel resolution.

Figure 3:
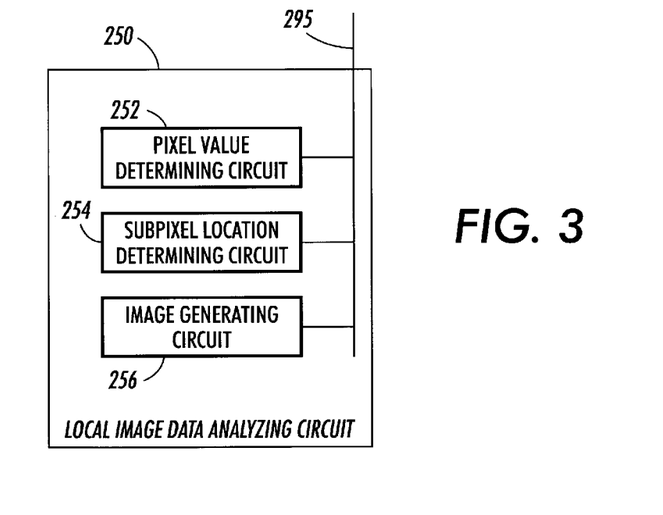
FIG. 3 shows in greater detail one exemplary embodiment of a functional block diagram of the local image data analyzing circuit of FIG. 2 in accordance with this invention.

FIG. 3 shows in greater detail one exemplary embodiment of a functional block diagram of the local image data analyzing circuit 250. As shown in FIG. 3, the local image data analyzing circuit 250 includes a pixel value determining circuit 252, a subpixel location determining circuit 254, and an image generating circuit 256, each connected to the data bus 295. The pixel value determining circuit 252 determines various parameters of an observed pixel pattern in the multi-bit pixels image that is to be processed. In particular, the pixel value determining circuit 252 determines the grayscale value of an observed pixel. The subpixel location determining circuit 254 uses various information to generate the subpixel location in the generated high addressability image. The subpixel location determining circuit 254 uses information obtained by the pixel value determining circuit 252. The image generating circuit 256 compiles the generated high addressability image from the modified pixels.

In accordance with this invention, a normal addressability image may be efficiently converted into a high addressability image. As shown in FIG. 3, the local image data analyzing circuit 250 includes an image generating circuit 256. The image generating circuit 256 works in conjunction with the subpixel location determining circuit 254. Specifically, the subpixel location determining circuit 254 generates high addressability image data. As the subpixel location determining circuit 254 performs this process, the image generating circuit 256 collects the generated high addressability image data. As a result, the image generating circuit 256 generates a full high addressability image.

In operation, an image to be processed, i.e., an "observed image," is input into the high addressability ink ejection printing system 200 or, alternatively, retrieved from the holding image memory 245 of the high addressability ink ejection printing system 200. In this exemplary embodiment, the observed image is a normal addressability grayscale image.

After inputting the observed image, the pixel value determining circuit 252 observes the observed image proceeding from target pixel to target pixel. Specifically, the pixel value determining circuit 252 may observe only a single target pixel in the observed image, or alternatively, may observe a windowed neighborhood surrounding and including the target pixel. The window may be used to observe pixels in rows both above and below a current scan line in the slow scan direction, as well as pixels of the current scan line in the fast scan direction. The window may use any of a wide variety of one-dimensional sizes to effectively observe the pixels.

Figure 4:
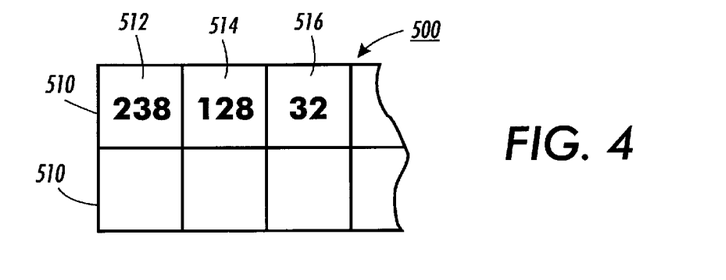
FIG. 4 is a diagram showing a pixel grid of an observed image having normal addressability in accordance with this invention.

As described above, in accordance with one exemplary embodiment of the systems and methods of invention, the pixel value determining circuit 252 progressively observes the grayscale value of each pixel in an observed image. FIG. 4 is a diagram illustrative of this process. FIG. 4 shows a scanline 510 and a plurality of pixels 512–516 arranged along the scanline 510. The pixels 512–516 each possess a grayscale value ranging from 0–255. In accordance with the systems and methods of the invention, the normal addressability pixels shown in FIG. 4 are converted or transformed into high addressability pixels.

Figure 5:
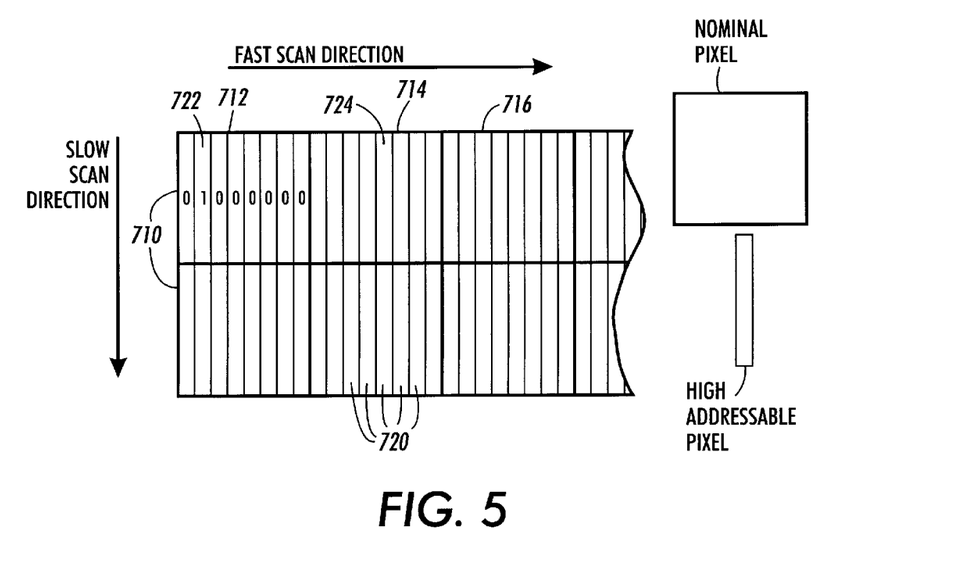
FIG. 5 is a diagram showing a pixel grid of a generated image having high addressability in accordance with this invention.

Illustratively, the pixel value determining circuit 252 observes the first pixel 512 in the scanline 510, shown in FIG. 4. The pixel 512 possesses a grayscale value of 238. The pixel value determining circuit 252 determines this value of the pixel 512 and outputs the value to the subpixel location determining circuit 254. The subpixel location determining circuit 254 uses this value to generate a high addressability image. FIG. 5 illustrates a high addressability image having an addressability of 8. Thus, the subpixel location determining circuit 254 operates to convert the image shown in FIG. 4 to an image of the type shown in FIG. 5. The subpixel location determining circuit 254 performs this conversion using the grayscale value of the pixel 512, an accumulated error value, and a predetermined threshold to determine which subpixels in the high addressability image 700 to print to reproduce an improved version of the observed image 500.

To perform this conversion, the subpixel location determining circuit 254 uses a system of relationships in accordance with various exemplary embodiments of the systems and methods of the invention to determine on which subpixel in the high addressability image 700 to fire, i.e., to print a drop of ink. One such set of exemplary relationships is:

If $X+E-T \leq M/R$, then $S=R$     (1)

If $X+E-T > M/R$, then $S=R-[(X+E-T)R/M]$     (2)

If $S<0$, then $S=0$ where:
   X is the image value of the current input pixel;
   E is the accumulated error for the current input pixel;
   T is a predetermined threshold;
   M is the maximum image data value for the input image;
   R is the ratio of the high addressability resolution to the input image resolution; and
   S is the subpixel index indicating which subpixel is printed, where S is rounded to the nearest integer and is set to zero if $[R-(X+E-T)R/M]$ is less than zero.

It should be appreciated that, according to Eqs. (1) and (2), when the maximum image data value M represents black, S=R represents the no-print condition, S=0 indicates the leftmost high addressability subpixel, and a maximum image data value for the current pixel results in the leftmost high addressability subpixel being printed. It will be readily apparent to those skilled in the art how to modify Eqs. (1) and (2) for cases where the maximum image data value M represents white.

For example, for an addressability ratio R of eight and a maximum image data value M for the input pixel of 255, Eqs. (1) and (2) become:

If $X+E-T \leq 32$, then $S=8$     (1a)

If $X+E-T > 32$, then $S=8-[(X+E-T)/32]$     (2a)

where:
   X is the gray value of the observed pixel in the observed image 500;
   E is the accumulated error;
   T is the predetermined threshold value; and
   S is the subpixel index indicating which subpixel is printed, where S is rounded to the nearest integer and is set to zero if $[8-(X+E-T)/32]$ is less than zero. Furthermore, S=8 designates that no subpixel is fired, i.e., that the pixel is white.

The subpixel index S merely dictates the location within a high addressability pixel where a subpixel is printed, and does not represent an actual output level (i.e., a gray value), as in multilevel error diffusion techniques, for example. The subpixel index indicates a location measured or counted from an appropriate starting point, i.e., generally the first subpixel in the observed target pixel.

Thus, as can be observed from Eqs. (1) and (2), the higher the gray value of the observed pixel, the lower the values of the subpixel index and thus the sooner the subpixel is printed. That is, a high gray scale value generally results in a lower subpixel index value. Moreover, a low subpixel index of 0 for an observed pixel in the observed image 500 will put the print drop at the first possible subpixel location. A high subpixel index of 7 puts the subpixel at the last subpixel location. A value of 8 means no pixel is printed.

To further explain, in Eq. (2), the integer 8 may be viewed as initially taking the print location out past the farthest print location of a particular high addressability pixel, thus turning off that pixel, resulting in a white pixel. A more-right print location will result in a lighter image because there will be more white space between a pixel printed at that location relative to a previous pixel, compared to a pixel printed at a more-left location. However, as the value of [(X+E−T)/32] increases due to an observed pixel having a high grayscale value, the resulting subpixel index S will progressively decrease. This decrease in the value of S will result in the next fired pixel being printed closer to the start count pixel, and thus resulting in a darker image.

The predetermined threshold value may be determined based on a variety of considerations. These considerations may include how the particular image was converted, the operating parameters of the particular device, and/or the desired resolution of the generated image. In this exemplary embodiment of the systems and methods of the invention, the predetermined threshold value is set to 8. The inclusion of the predetermined threshold value in Eq. (2) essentially provides the ability to vary the output of the high addressability ink ejection printing system 200. For example, an operator of a printer device including the high addressability ink ejection printing system 200 may be provided with an ability to vary the value of T. Alternatively, the value of T in a device may be permanently set at the factory, or alternatively, may automatically vary based on certain sensed conditions in a printer device, for example.

The first pixel in the scanline 510 shown in FIG. 4 has a grayscale value of 238. Assuming the scanline 510 is the first scanline of the image, the accumulated error E for the pixel 510 is zero. Using Eqs. (1a) and (2a), the subpixel location determining circuit 254 determines that Eq. (1) is not applicable since:

$$X=238$$

and $$238>32.$$

Thus, the subpixel location determining circuit 254 applies Eq. (2). Factoring the values into Eq. (2a), S is:

$$S=8-[(238+0-8)/32] \quad (3)$$

$$S=0.81 \to S_R=1,$$

where $S_R$ designates rounding to the nearest integer.

Thus, once the subpixel location determining circuit 254 determines the value of $S_R$, the subpixel location determining circuit 254 determines the subpixel print location based on the value $S_R$.

As discussed above, one constraint with known printers is that an individual ink ejector cannot be repeatedly fired too soon, because the ejector may not have had time to refill since the last firing. Moreover, known printer devices generally can print an additional subpixel only when it is at least C subpixels away from a previously printed subpixel, where C is usually the high addressability of the printer. For example, the next pixel to be printed must be at least eight subpixels away from a previously fired subpixel, assuming an addressability of 8.

However, as indicated above, an error amount is generated whenever a drop is ejected for an image value that is less than full black. This error value is then applied to at least the next pixel, which, in general, should ensure that the next pixel will print in a subpixel that is at least C subpixels away from the subpixel in which the previous pixel was printed. Should the error be distributed and/or the threshold be set such that this relationship cannot be ensured, an adjustment can be applied to the determined subpixel value for a current pixel $S_{R_p}$ to ensure it is at least C subpixels away from the determined subpixel value for the previous pixel $S_{R_{p-1}}$. In this case:

$$S_a = S_R, \ S_{R_p} - S_{R_{p-1}} \geq C-H \quad (4)$$

$$S_a = S_{R_{p-1}}, \ S_{R_p} - S_{R_{p-1}} < C-H \quad (5)$$

where:

$S_{R_p}$ is the subpixel value of the current pixel;

$S_{R_{p-1}}$ is the subpixel value of the previous pixel;

$S_a$ is the adjusted subpixel value;

C is the minimum number of subpixels; and

H is the high addressability value.

As described above, FIG. 5 shows pixels 712–716 positioned along a scan line 710. Each of the pixels 712–716 include 8 subpixels 720. As also described above, the subpixel location determining circuit 254 determines the value of $S_R$. Then, the subpixel location determining circuit 254 determines the subpixel print location based on the value $S_R$. As a result, with reference to FIG. 5, the subpixel location determining circuit 254 determines that in the pixel 512, the subpixel 722 should be printed. This determination is performed based on Eqs. (1) and (2). In this manner, a pixel in the observed image is effectively mapped onto a subpixel in the generated high addressability image.

Once the subpixel location determining circuit 254 identifies the subpixel 722 for the corresponding pixel 512, then the subpixel location determining circuit 254 must determine the subpixel for the next pixel 514 in the observed image. To accomplish this, the controller 210 controls the pixel value determining circuit 252 to determine the grayscale value of the next pixel 514 shown in FIG. 4. The pixel value determining circuit 252 determines that the grayscale value of the pixel 514 is 128. This grayscale value is then input into the subpixel location determining circuit 254 to determine the subpixel of the corresponding pixel 714. Since 128>32, the subpixel location determining circuit 254 uses the relationship of Eq. (2).

In the above example, the image value of the pixel 512 is 238. This image value resulted in an S value of 0.81, which was round to 1. As the value of S increases, the generated image becomes lighter. That is, as S increases, the next identified subpixel will be farther away from the previous identified subpixel. For the pixel 514, assuming all of the error for the pixel 512 is distributed to the next pixel 514, the accumulated error from the pixel 512 is 17 (=255−238). The error is a result of one of the subpixels in the pixel 514 being printed at the full black value of 255; while the original pixel had an image value of only 238.

It should also be appreciated that, instead of rounding S to the nearest integer, S can instead always be rounded down, or rounded up. The particular type of rounding applied to S is left to the user.

To explain further, if a grayscale value of 255 is observed on a pixel, then one subpixel may be printed to represent that 255 value. There will be no error, because one subpixel per pixel is the darkest that can be printed. However, if the grayscale value of an observed pixel is less than 255, and if a subpixel is printed, then an error is generated. Thus, an error amount is generated whenever a drop is ejected for an image value which is less than full black.

The accumulated error E for the pixel 514 is 238–255 or −17. According to Eq. (2a), based on the accumulated error E of 17, the threshold T of 8, and the image value X of 128 for pixel 514 shown in FIG. 4, the subpixel value for the pixel 514 is 5. This subpixel value of 5 is more than 8 subpixels away from the subpixel value of 1 for the pixel 514. Further, even if the image value for the pixel 514 were the maximum image value of 255, the resulting subpixel value $S_R$ would be:

$$1=8-((255-17-8)*(1/32)).$$

It should be recognized that the systems and methods according to this invention do not require an extensive amount of memory. In fact, the systems and methods according to this invention require about the same amount of processing as a normal error diffusion process.

In accordance with the systems and methods according to this invention, a binary output could easily be created by converting all the subpixels to 0s and 1s for the subpixels that are white and black, respectively. For example, this data may take the form of: (0 1 0 0 0 0 0 0), which would dictate printing the second subpixel. But this does not take advantage of the natural compression inherent in the representation of the data.

To explain, a high resolution binary file takes 8 bits per pixel of the original image. By using subpixels the data is automatically compressed and requires only 4 bits. Such automatically compressed data may be in the form, for example, of:

| Data | Print Location |
| --- | --- |
| (0000) | subpixel 0 |
| (0001) | subpixel 1 |
| (0010) | subpixel 2 |
| (0011) | subpixel 3 |
| (0100) | subpixel 4 |
| (0101) | subpixel 5 |
| (0110) | subpixel 6 |
| (0111) | subpixel 7 |
| (1ZZZ) | No Print | where Z indicates a value of 0 or 1.

In fact, if an addressability of $2^{n-1}$ is used, for example, 7, 15 or 31, an extra bit of data can be saved. This may be used, for example, for an addressability of 7 that would require only 3 bits. Illustratively, using data in this form, data values of (000) to (110) represent the subpixels, while a data value of (111) indicates no printing.

The specific type of data used will depend on the capabilities of the specific printing system the data is sent to. If the image data sink 300 can interpret the compressed data, there may be additional savings attained in using the compressed data. This may be the case, in particular, if the data is prepared directly for the printhead.

The subpixel location determining circuit 254 in accordance with the systems and methods of this invention is not limited to using the equations set forth above. Alternatively, the subpixel location determining circuit 254 may accomplish the mapping of the observed image to the high addressability image using any system of equations that processes information regarding the properties of a particular input pixel to generate a high addressability image having a selectively fired subpixel. These equations, like the equations discussed above, may be stored in the subpixel determining memory 246. For example, a Boolean logic technique may be employed using a logical sum of products.

Alternatively, it should be recognized that the mapping may be accomplished using expert knowledge in a wide variety of ways to relate input patterns to desired processed output patterns.

Further, in accordance with the systems and methods of this invention, the subpixel location determining circuit 254 may use a suitably designed look-up table rather than a set of equations. The look-up table may be stored in the subpixel determining memory 246 in accordance with the systems and methods of this invention and may be generated in any suitable manner. For example, the look-up table may be generated using statistical optimization techniques to map the input values to modified output values.

As an alternative to statistical optimization techniques, the look-up table may be generated using expert knowledge. Specifically, the mapping of the look-up table may be designed through expert selection of input and output values based on extensive experimentation. The systems and methods of the invention may perform well for a wide variety of scanned images.

Also, it should be recognized that the look-up table does not necessarily have to be a full look-up table. That is, a sparse look-up table may be used. As should be recognized, a sparse look-up table would be smaller than the full look-up table. Furthermore, a sparse look-up table would rely on conventional techniques, such as, for example, averaging and other interpolation, for input values that are not explicitly defined in the sparse look-up table.

It should be recognized that the exemplary embodiment of the high addressability ink ejection printing system 200 in accordance with this invention described above behaves similarly to a pulse density modulation-like process or approach. Further, the technique described above places all of the accumulated error on the next pixel on the scan line. It has been observed that the pulse density modulation-like approach, as described above, is not particularly well-suited for, for example, highlight regions of an image.

Rather, in the highlight regions, almost all the pixels will print on the last subpixel. Furthermore, without correlation between scanlines, there is a stronger than normal tendency for image artifacts, such as worms. By using normal error diffusion weights in this region, output as good as an error diffused output can be obtained. Further, approaches like the threshold stamping method disclosed in to U.S. Pat. No. 5,748,785 to Mantell et al. are compatible with this approach. Accordingly, it is desirable to use normal error diffusion weights in the highlights. However, most or all of the error should still go to the next pixel in the shadows. That is, if normal error diffusion weights are used throughout, the one-dimensional pulse-density-modulation-like approach according to this invention does not occur in the shadows. Accordingly, an improved high addressability image would not be generated.

Illustratively, the image may printed using fixed weighting parameters. These weighting parameters may be selected about a target pixel with a distribution as follows:

$$16a_1=8$$

$$16a_2=4$$

$$16a_3=2$$

$$16a_4=0$$

and $$16a_5=2$$

where:

$a_1$ is the weight applied to a pixel that is one pixel ahead of the current pixel along the direction of analysis;

$a_2$ is the weight applied to a pixel that is directly below the current pixel;

$a_3$ is the weight applied to a pixel that is one pixel below and one pixel behind the current pixel;

$a_4$ is the weight applied to a pixel that is one pixel below and two pixels behind the current pixel; and $a_5$ is the weight applied to a pixel that is one pixel below and three pixels behind the current pixel.

Alternatively, the weighting parameters may be used that change continuously. Specifically, the weighting parameters may change according to the following rule:

Normal weights; $X \leq 64$ $a_i(X) = a_i(0)((255-X)/192)$; $i>1$ and $X>64$ $a_1(X) = 1 - \text{Sum}(a_i(X))$.

where $a_i(0)$ is the normal weight indicated above.

Such a continuous change in the weighting parameters may be desirable in processing certain images. However, it should be appreciated that such varying weighting parameters could require a large amount of processing complexity. Further, such processing may not be necessary.

Alternatively, the weighting parameters may be controlled in a stepped manner. Such a stepped manner is adequate with the processing of some images. Illustrative stepped weighting parameters are as follows.

|  | $16a_1$ | $16a_2$ | $16a_3$ | $16a_4$ | $16a_5$ |
|---|---|---|---|---|---|
| X < 64 | 8 | 4 | 2 | 0 | 2 |
| 64 ≤ X < 112 | 10 | 4 | 2 | 0 | 0 |
| 112 ≤ X < 160 | 10 | 4 | 2 | 0 | 0 |
| 160 ≤ X < 192 | 12 | 4 | 0 | 0 | 0 |
| 192 ≤ X | 14 | 2 | 0 | 0 | 0 |

This minimal set of stepped weights has worked well on a variety of images. The changes in error distribution are chosen such that only the location of a given error term needs to be changed at various gray levels, and that no additional weighting needs to be involved. As a result, with this type of error distribution adjustments, very little additional processing is required. Because the weights are distributed to fewer locations as the error increases, the error diffusion process is very efficient.

It should be recognized that the systems and methods in accordance with the invention do not necessarily have to work with, i.e., analyze, the full or complete image that is input. Rather, the systems and methods may analyze only a portion or a segment of the image, such as text or line art.

Further, in the exemplary embodiments of the systems and methods according to this invention, as described above, the observed image is a normal addressability image. However, it is also contemplated that the originally input, or observed, image may itself be a high addressability image. Illustratively, the high addressability data may be analyzed to determine an equivalent grayscale value of a nominal pixel. This information may then be used as described above to generate a high addressability image in accordance with the invention.

In accordance with the exemplary embodiments of the high addressability ink ejection printing system 200 described above, the process according to the invention is performed using a suitably programmed general purpose computer. However, it should be recognized that the systems and methods of the invention are not limited to application using a general purpose computer. Rather, the systems and methods according to the invention may be implemented using any suitable arrangement of electronic and imaging components, expert knowledge, or alternatively, a mixture of electronic and imaging components in conjunction with expert knowledge. Further, it should be recognized that the processes in accordance with the systems and methods of the invention may be performed by hand, using hand calculations, for example.

The image processing process according to the invention may be applied to a variety of applications and environments. Further, it should be recognized that numerous variations of the systems and methods in accordance with the invention may be performed using the general process described in conjunction with FIGS. 2–5.

Figure 6:
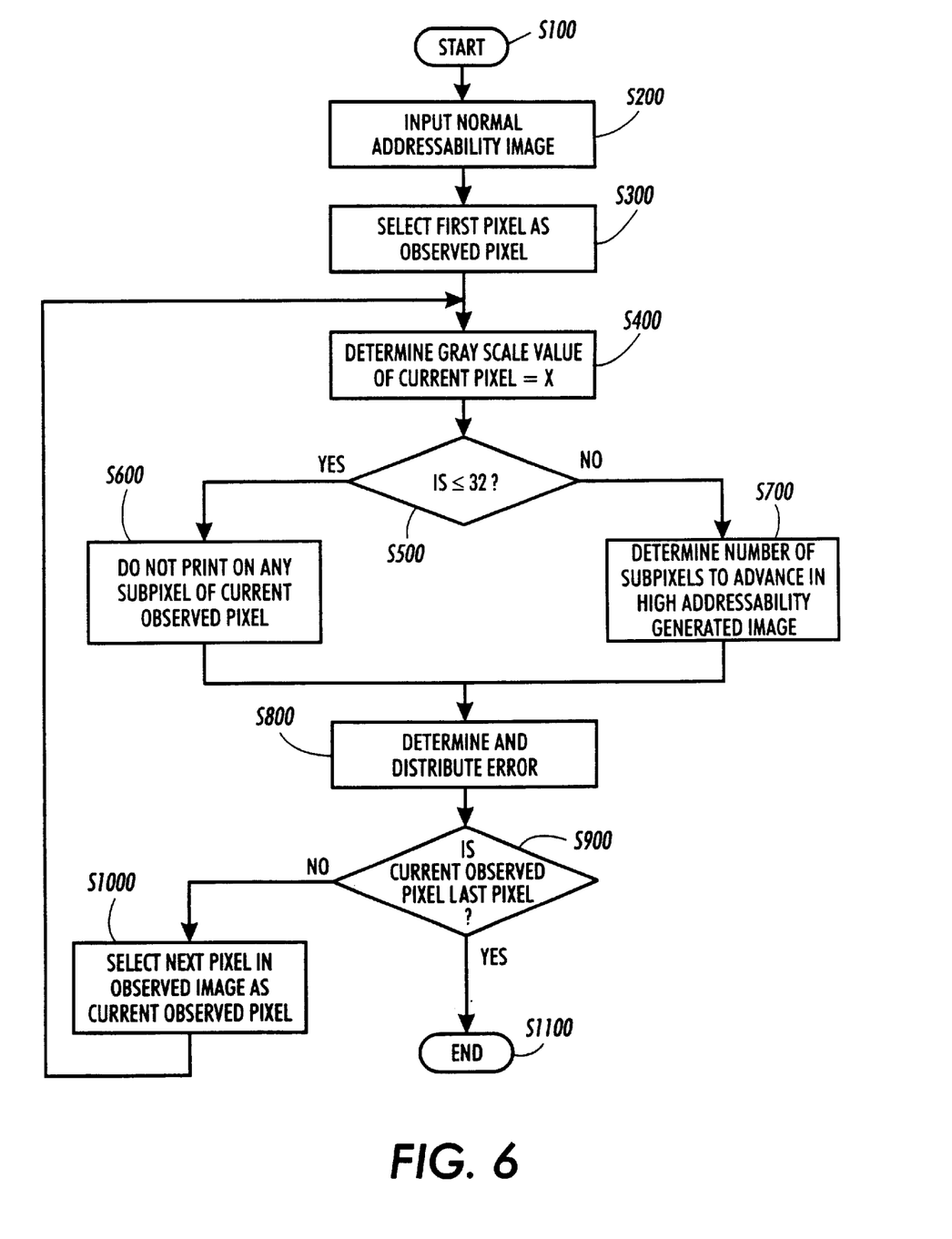
FIG. 6 is a flowchart outlining one exemplary embodiment of a method for generating a high addressability image in accordance with this invention.

FIG. 6 is a flowchart outlining one exemplary embodiment of a high addressability image generating method according to this invention. As shown in FIG. 6, the processing process begins in step S100, and continues to step S200, where a normal addressability image, i.e., an observed image, is input. Then, in step S300, the first pixel in the observed image is selected as the observed or current pixel. Control then passes to step S400.

In step S400, the grayscale value "X" of the current normal addressability pixel is determined. Then, in step S500, a determination is made whether the grayscale value X of the current normal addressability pixel is at most equal to 32. If, in step S500, the grayscale value of the current normal addressability pixel is 32 or less, control continues to step S600. Otherwise, control jumps to step S700. In step S600, a determination is made that no subpixel should be printed for the current pixel. Control then jumps to step S800. In contrast, in step S700, the subpixel to be fired for the current observed pixel is determined. Control then continues to step S800.

In step S800, the error between the output pixel value, which is 255 or 0, depending on whether any of the high addressability subpixels for the current pixel were printed, or if no high addressability pixel was printed, and the grayscale image value of the current pixel is determined and distributed to at least one subsequent observed pixel. Then, in step S900, a determination is made whether the current observed pixel is the last pixel. This may be a determination whether the current observed pixel is the last pixel in the scan line or in the entire image. If the current pixel in the observed image is not the last pixel, control continues to S1000. Otherwise, control jumps to step S1100. In step S1000, the next pixel is selected as the current observed pixel. Control then returns to S400. In contrast, in step S1100, the process ends.

Figure 7:
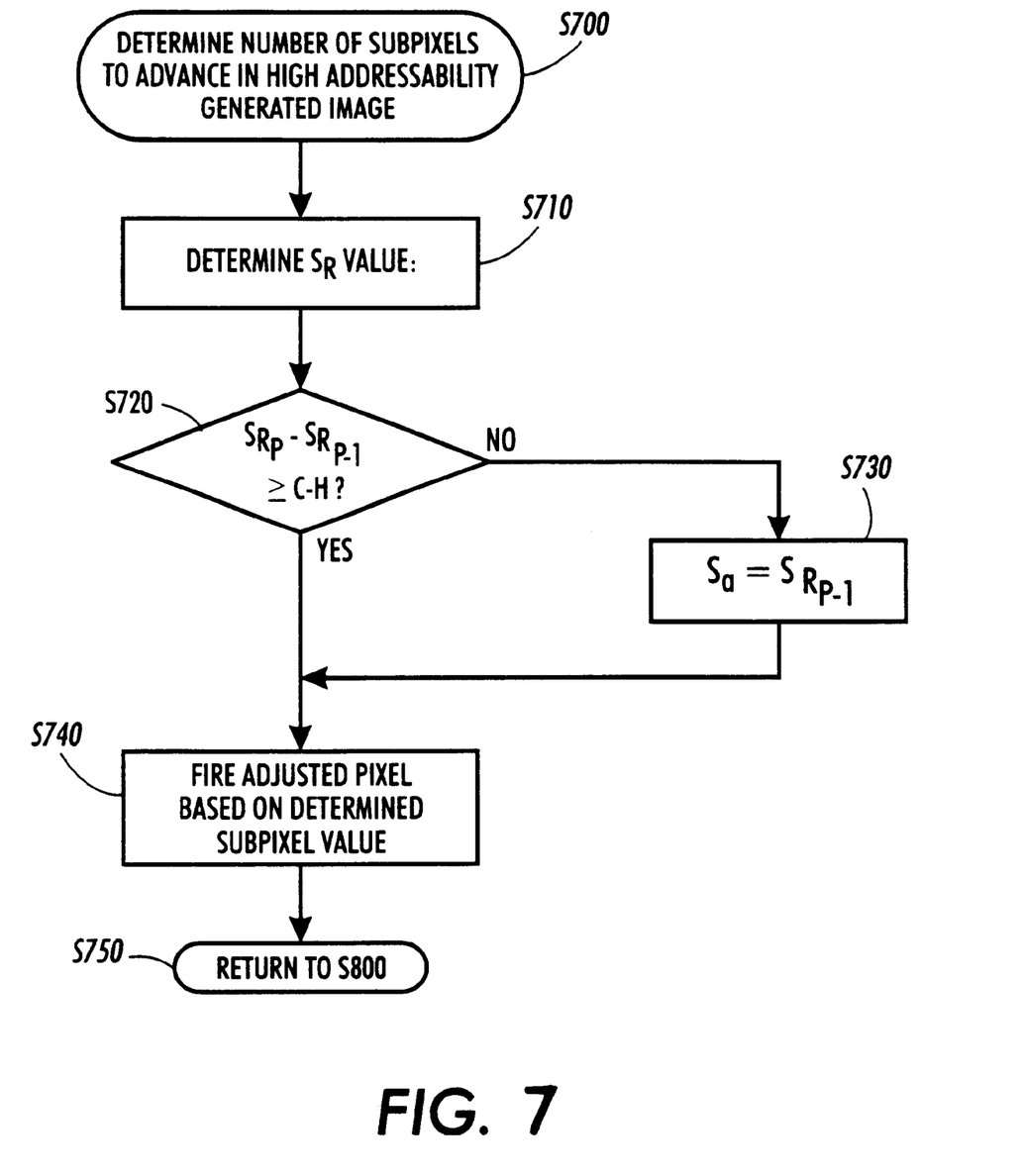
FIG. 7 is a flowchart outlining in greater detail one exemplary embodiment for determining the print location of the next subpixel step of FIG. 6.

FIG. 7 is a flowchart outlining in greater detail one exemplary embodiment of the determination of the location of the printed subpixel within the current observed pixel. Beginning in step S700, control continues to step S710, where the value of $S_R$ for the current normal addressability pixel is determined using Eqs. (1) and (2).

Next, in step S720, a determination is made whether the subpixel value for the current normal addressability pixel is sufficiently far enough away from the printed subpixel value of the previous pixel. This can be done using Eqs. (4) and (5), but can also be done any other appropriate way. If, in step S720, the determined subpixel value is sufficiently far enough away, control jumps to step S740. Otherwise control continues to step S730. In step S730, the subpixel value determined in step S720 is adjusted to ensure the subpixel value for the current pixel is sufficiently far enough away. Control then continues to step S740. In step S740, the subpixel location determined in step S710 is fired, i.e., printed. Then, in step S750, control returns to step S800 of FIG. 6.

However, it should be appreciated that steps S720 and S730 can be omitted, such that control jumps directly from step S710 to step S740.

The high addressability ink ejection printing system 200 shown in FIGS. 2 and 3 is preferably implemented on a programmed general purpose computer. However, the high addressability ink ejection printing system 200 shown in FIGS. 2 and 3 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 6 and 7, can be used to implement the high addressability ink ejection printing system 200.

In particular, it should be understood that each of the circuits shown in FIGS. 2 and 3 can be implemented as portions of a suitably programmed general purpose computer. Alternatively, each of the circuits shown in FIGS. 2 and 3 can be implemented as physically distinct hardware circuits within an ASIC, or using a FPGA, a PDL, a PLA or a PAL, or using discrete logic elements or discrete circuit elements. The particular form each of the circuits shown in FIGS. 2 and 3 will take is a design choice and will be obvious and predicable to those skilled in the art.

The memory 240 is preferably implemented using static or dynamic RAM. However, the memory 240 can also be implemented using a floppy disk and disk drive, a writable optical disk and disk drive, a hard drive, flash memory or any other known or later developed alterable volatile or non-volatile memory device or system.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for generating high addressability print data having a high addressability resolution from image data having a plurality of input pixels at an input resolution that is less than the high addressability resolution, each pixel at the input resolution corresponding to a group of subpixels at the high addressability resolution, comprising:
   inputting, for a current pixel at the input resolution, multi-bit image data corresponding to the current input pixel; and
   converting the multi-bit image data value corresponding to the current input pixel into an index value indicative of a location of a subpixel, of the group of subpixels that corresponds to the current input pixel, that is to be marked, without determining a gray value for any of the subpixels.

2. The method of claim 1, further comprising:
   determining, for the current pixel, an error value between the multi-bit image data value of the current input pixel and a marked multi-bit image data value determined based on the determined index value; and
   distributing the determined error value to at least one subsequent input pixel.

3. The method of claim 2, wherein:
   when the index value indicates a mark is to be formed, the marked multi-bit image data value is equivalent to a darkest multi-bit image data value; and
   when the index value indicates a mark is not to be formed, the marked multi-bit image data value is equivalent to a lightest multi-bit image data value.

4. The method of claim 2, wherein, when the determined error value is to be distributed to at most one subsequent input pixel, the determined error value is distributed to a next input pixel.

5. The method of claim 2, wherein, when the determined error value is to distributed to a plurality of subsequent input pixels, each of the plurality of subsequent input pixels receives a portion of the determined error value, the portion of the determined error value received by each of the plurality of subsequent input pixels based on the multi-bit image data value of the current input pixel.

6. The method of claim 5, wherein, for each of the plurality of subsequent input pixels, the portion of the determined error value distributed to that subsequent input pixel is a continuous function of the multi-bit image data value of the current input pixel.

7. The method of claim 5, wherein, for each of the plurality of subsequent input pixels, the portion of the error value distributed to that subsequent input pixel is a stepped function of the multi-bit image data value of the current input pixel.

8. The method of claim 2, wherein, when the error value is to distributed to a plurality of subsequent input pixels, each of the plurality of subsequent input pixels receives a portion of the error value, the portion of the error value received by each of the plurality of subsequent input pixels based on a predetermined set of distribution weights.

9. The method of claim 1, wherein the index value corresponding to the current input pixel is determined based on the multi-bit image data value, a sum of any error value portions distributed to the current input pixel, a threshold value and a ratio of the high addressability resolution to the input resolution.

10. The method of claim 9, wherein:

$$S=R-[(X+E-T)R/M],$$

where:
   S is the index value;
   R is the ratio of the high addressability resolution to the input resolution;
   X is the multi-bit image data value of the current input pixel;
   E is the accumulated error for the current input pixel;
   T is a predetermined threshold value; and
   M is the number of multi-bit image data values at the input resolution.

11. The method of claim 10, further comprising rounding the index value S to the nearest integer.

12. The method of claim 1, further comprising:
   comparing the index value corresponding to the current input pixel to the index value determined for an immediately preceding input pixel; and
   adjusting the index value for the current input pixel when the difference between the index value for the current input pixel and the index value for the immediately preceding input pixel is less than a threshold value.

13. The method of claim 12, wherein adjusting the index value for the current input pixel comprises setting the index value for the current input pixel to the index value of the immediately preceding input pixel.

14. The method of claim 1, further comprising:
   determining a number of subpixels occurring between a previously marked subpixel and a current subpixel, at least the current subpixel indicated by the index value determined for the current input pixel; and
   adjusting the index value for the current input pixel when the determined number of subpixels is below a predetermined threshold.

15. An apparatus for generating high addressability print data having a high addressability resolution from image data having a plurality of input pixels at an input resolution, each pixel at the input resolution corresponding to a group of subpixels at the high addressability resolution, comprising:

an interface that inputs the image data;

a memory that stores at least the input image data;

a local image data analyzing circuit;

an error value determining circuit; and an error distributing circuit;

wherein, for each said input pixel, the local image data analyzing circuit converts the multi-bit image data value for the input pixel into an index value indicative of a location of a subpixel, of the group of subpixels that correspond to the input pixel, that is to be marked, without determining a gray value for any of the subpixels.

16. The apparatus of claim 15, wherein the error value determining circuit determines for each input pixel, an error value between the multi-bit image data value of at the input pixel and a marked multi-bit image data value corresponding to the determined index value.

17. The apparatus of claim 16, wherein the error value distributing circuit distributes the determined error value for that pixel to at least one subsequent input pixel.

18. The apparatus of claim 17, wherein, when the error value distributing circuit distributes the error value to a plurality of subsequent input pixels, the error value distributing circuit distributes a portion of the error value to each of the plurality of subsequent input pixels, the portion of the error value distributed to each of the plurality of subsequent input pixels based on the multi-bit image data value of the current input pixel.

19. The apparatus of claim 18, wherein, for each of the plurality of subsequent input pixels, the error distributing circuit distributes the portion of the error value to that subsequent input pixel based on a continuous function of the multi-bit image data value of the current input pixel.

20. The apparatus of claim 18, wherein, for each of the plurality of subsequent input pixels, the error distributing circuit distributes the portion of the error value to that subsequent input pixel based on a stepped function of the multi-bit image data value of the current pixel.

21. The apparatus of claim 16, wherein:

when the index value indicates a mark is to be formed, the marked multi-bit image data value is equivalent to a darkest multi-bit image data value; and when the index value indicates a mark is not to be formed, the marked multi-bit image data value is equivalent to a lightest multi-bit image data value.

22. The apparatus of claim 16, wherein, when the error value is to be distributed to at most one subsequent input pixel, the error value is distributed to a next input pixel.

23. The apparatus of claim 15, wherein the local image data analyzing circuit determines the index value corresponding to the current input pixel based on the multi-bit image data value, a sum of any error value portions distributed to the current input pixel, a threshold value and a ratio of the high addressability resolution to the input resolution.

24. The apparatus of claim 23, wherein the local image data analyzing circuit determines the index value S as:

$$S=R-[(X+E-T)R/M],$$

where:

R is the ratio of the high addressability resolution to the input resolution;

X is the multi-bit image data value of the current input pixel;

E is the accumulated error for the current input pixel;

T is a predetermined threshold value; and

M is the maximum multi-bit image data value of the input image.

25. The apparatus of claim 24, wherein the local image data analyzing circuit round the index value S to the nearest integer.

26. The apparatus of claim 15, wherein the local image data analyzing circuit compares the index value corresponding to the current input pixel to the index value determined for an immediately preceding input pixel, and adjusts the index value for the current input pixel when the difference between the index value for the current input pixel and the index value for the immediately preceding input pixel is less than a threshold value.

27. The apparatus of claim 26, wherein the local image data analyzing circuit adjusts the index value for the current input pixel by setting the index value for the current input pixel to the index value of the immediately preceding input pixel.

28. The apparatus of claim 15, wherein the local image data analyzing circuit determines a number of subpixels occurring between a previously marked subpixel and a current subpixel, at least the current subpixel indicated by the index value determined for the current input pixel, and adjusts the index value for the current input pixel when the determined number of subpixels is below a predetermined threshold.

* * * * *